United States Patent [19]
Hummel

[11] Patent Number: 5,711,474
[45] Date of Patent: Jan. 27, 1998

[54] METHOD AND APPARATUS FOR WELDING TUBULAR MEMBERS

[76] Inventor: Jon C. Hummel, 210 W. Front St., Perrysburg, Ohio 43551

[21] Appl. No.: 572,112

[22] Filed: Dec. 14, 1995

Related U.S. Application Data

[60] Provisional application No. 60/002,475, Aug. 18, 1995.
[51] Int. Cl.⁶ .................................................. B23K 37/053
[52] U.S. Cl. .................................... 228/212; 212/44.5
[58] Field of Search ............................... 228/212, 213, 228/44.5, 49.4, 183, 184; 219/60 A, 61.1, 61.7

[56] References Cited

U.S. PATENT DOCUMENTS

| | | |
|---|---|---|
| 3,095,844 | 7/1963 | Thielsch ........................... 228/219 |
| 3,688,069 | 8/1972 | Kazlauskas . |
| 3,688,070 | 8/1972 | Smith . |
| 3,688,071 | 8/1972 | Kennelly . |
| 3,688,072 | 8/1972 | Witt . |
| 3,960,311 | 6/1976 | Griffiths . |
| 4,084,739 | 4/1978 | Koltz et al. ....................... 228/219 |
| 4,857,690 | 8/1989 | Kazlauskas . |
| 5,052,609 | 10/1991 | Tesch ............................... 228/44.5 |
| 5,398,862 | 3/1995 | Aleman ............................ 228/44.5 |
| 5,538,173 | 7/1996 | Hummel ........................... 228/44.5 |

OTHER PUBLICATIONS

Metals Handbook, Ninth Edition, vol. 6, p. 109, "Pipe Welding", and pp. 214–224, Plasma Arc Welding, Dec. 1983.

*Primary Examiner*—Samuel M. Heinrich
*Attorney, Agent, or Firm*—Donald R. Fraser

[57] ABSTRACT

A method and apparatus for welding two tubular members together in butting relation is described. The method and apparatus include apparatus capable of delivering a purge gas to a zone adjacent the inner surface of the tubular members and effecting relative movement between the tubular members and a welding torch to weld the butting ends of the tubular members together.

5 Claims, 5 Drawing Sheets

METHOD AND APPARATUS FOR WELDING TUBULAR MEMBERS

This application is filed under the provisions of 35 U.S.C. 111(a) and claims the benefits of a provisional application Ser. No. 60/002,475 filed Aug. 18, 1995 under the provisions of 35 U.S.C. 111(b).

BACKGROUND OF THE INVENTION

1. Field of the Invention

The present invention relates generally to a method and apparatus for welding tubular members and more particularly to a method and apparatus for maintaining alignment of the tubular of members in butting relation, delivering a purge gas to a defined zone at the junction of the tubular members and creating a weld at the junction of the tubular members.

2. Prior Art

With the increased demand and utilization of stainless steel in dairy, food, and biotechnology applications, newer and more sophisticated welding systems have been introduced.

One of the popular methods of joining stainless steel tubing for piping systems in the dairy, food, and biotechnology industries is known as "orbital" welding. Technically, the welding path in such systems is annular and not orbital. The welding torch typically travels a path which is concentric with the tubular product being welded. Since most tubing is circular in cross-section and not elliptical, the welding torch must travel in a circular or annular path to effect the desired weld.

Orbital welding is a mechanized version of the gas tungsten arc welding or tungsten inert gas (GTAW or TIG) process which can be done with or without the addition of filler or wire to the weldment. The typical orbital weld for biotech, food and dairy piping is a single-pass fusion butt weld with no wire added. The weld parameters are regulated to a very precise degree of accuracy by the associated power supply. For each diameter (OD) and wall thickness of tubing, pipe, and/or fittings, a weld program or schedule is employed to control the power supply. The weld program typically specifies the time that the weld head is to be purged with the inert purge gas prior to and after.

Nevertheless, the "orbital" welding systems produce a smooth inner weld bead providing a surface which may be readily cleaned and maintained free from contaminants. This structural feature is particularly important for piping systems designed to be cleaned or sterilized inplace. It has been believed that weld parameters are a function of the welding power supply and the tube dimensions. For example, weld current (or amperage) is a function of the wall thickness of the tubular products being welded. Another parameter is the relative rotational speed of the weld bead rotor and the tubular members; the larger the tubular members, the slower the rotational speed, causing the welding electrode surface travel speed to be a function of tube size.

The necessary desiderata of the welding system includes full weld penetration with an even uniform weld bead around the entire circumference that is neither excessively concave nor convex and with minimal discoloration due to oxidation.

Orbital welding was developed in the 1960s for hydraulic lines for aircraft and has since been used in many other aerospace applications. In the 1970s it was used on a limited basis for welding 304 or 316 stainless steel tubing in pharmaceutical water for injection and distilled water piping systems. Since the 1980s, when orbital welding was adopted as the standard method of joining of electropolished 316L stainless steel process gas lines used for the manufacture of semiconductor chips, the use of orbital welding has been steadily increasing. The emerging bioprocess industry has a critical need for maintaining the sterility of water to be used in the manufacture of pharmaceutical products and also requires efficient cleaning of the associated product lines. Sterilizability and cleanability of piping systems requires a very smooth surface finish on the inside of the tubing including the joints, and while welds on tanks and vessels are generally polished before being put into service, welds on the inside of piping are typically put into service as-welded. This demands an inner weld bead that is as smooth as possible and free from unfused areas, cracks or crevices which might harbor bacteria and contaminate a process or become an initiation site for corrosion. For the semiconductor industry, a smooth inner weld bead in process gas lines means the elimination of entrapment sites for particulates that would adversely affect product yield.

Orbital welding, which is capable of a high degree of repeatability from joint to joint, makes it more feasible to consistently achieve the required level of weld quality throughout a critical piping system. The demand for orbital welding in food and dairy applications has been less than that in the high tech industries, but in the last few years there has been a significant increase in these areas as well.

Along with the increased demand for orbital welding is the requirement of increased quality control of the resultant weldments. Quality of the welded product is dependent upon a number of factors, including the following:

1) Full penetration welds
2) Embedded iron
3) Existence of surface oxides

Unless full penetration welds are formed in the weldments, the optimum strength is jeopardized. Lack of full penetration may create crevices within which corrosion takes place leading to unduly early failure of the weld joint.

Embedded free iron in the welded stainless steel members causes the occurrence of rust spots. Free iron is most often embedded in stainless steel during the welding thereof. Care must be taken to avoid physical contact between the stainless steel members being welded and lifting tools, steel tables, and storage racks, for example. Brushes formed of carbon steel wire should never be used in connection with stainless steel members to be welded.

Surface oxides can be sources of corrosion of welded stainless steel parts. For the maximum resistance to corrosion, the stainless steel surfaces should be from surfaces oxides. These oxides may be in the form of heat tint resulting from welding on the reverse side, or on the weld, or in the heat affected zone (HAZ).

The surface oxides vary from thin, straw color, purple color to a heavy black oxide. The darker the color and the heavier the oxide, the more likely pitting corrosion will develop, causing serious attack to the underlying metal.

SUMMARY OF THE INVENTION

It is a primary object of the invention to produce an apparatus and method for welding two tubular members of stainless steel wherein the resultant weld is of a quality readily accepted in the food, dairy and biotechnical fields.

It is another object of the invention to produce a method and apparatus for welding tubular members of stainless steel wherein the weld completely penetrates the thickness of the wall of the members being welded.

Another object of the invention is to produce a method and apparatus for welding tubular members wherein the inner and outer weld beads of the weld joint are substantially flat.

Another object of the invention is to produce a method and apparatus for welding tubular members of stainless steel wherein the conditions adjacent the weld zone militate against the formation of surface oxides.

Another object of the invention is to produce a method and apparatus for welding tubular members wherein the weld zone is flooded with a purge gas which effectively displaces air and removes heat energy from the weld zone.

Another object of the invention is to produce a method and apparatus for welding tubular members wherein pre-tacking of the members being welded is unnecessary due to accurate alignment maintenance during welding.

Still another object of the invention is to produce a method and apparatus for welding tubular members wherein heat energy at the weld zone is efficiently and quickly removed therefrom.

The above objects of the invention are typically achieved by a process for welding two tubular members in butting relation including the steps of causing at least two adjacent ends of the tubular members to butt against one another to form a butting interface; forming a gas passageway in the inner surface at the butting interface of the tubular members; delivering a purge gas to said passageway; positioning a welding torch adjacent the outer surface of the butting interface of the tubular members; and effecting relative rotational movement between the torch and the tubular members to weld the butting ends of tubular members together in a purge gas atmosphere.

Further objects and advantages of this invention will be apparent from the following description and appended claims, reference being made to the accompanying drawings forming a part of the specification, wherein like reference characters designate corresponding parts in the several views.

DETAILED DESCRIPTION OF THE PREFERRED EMBODIMENT OF THE INVENTION

Figure 1:
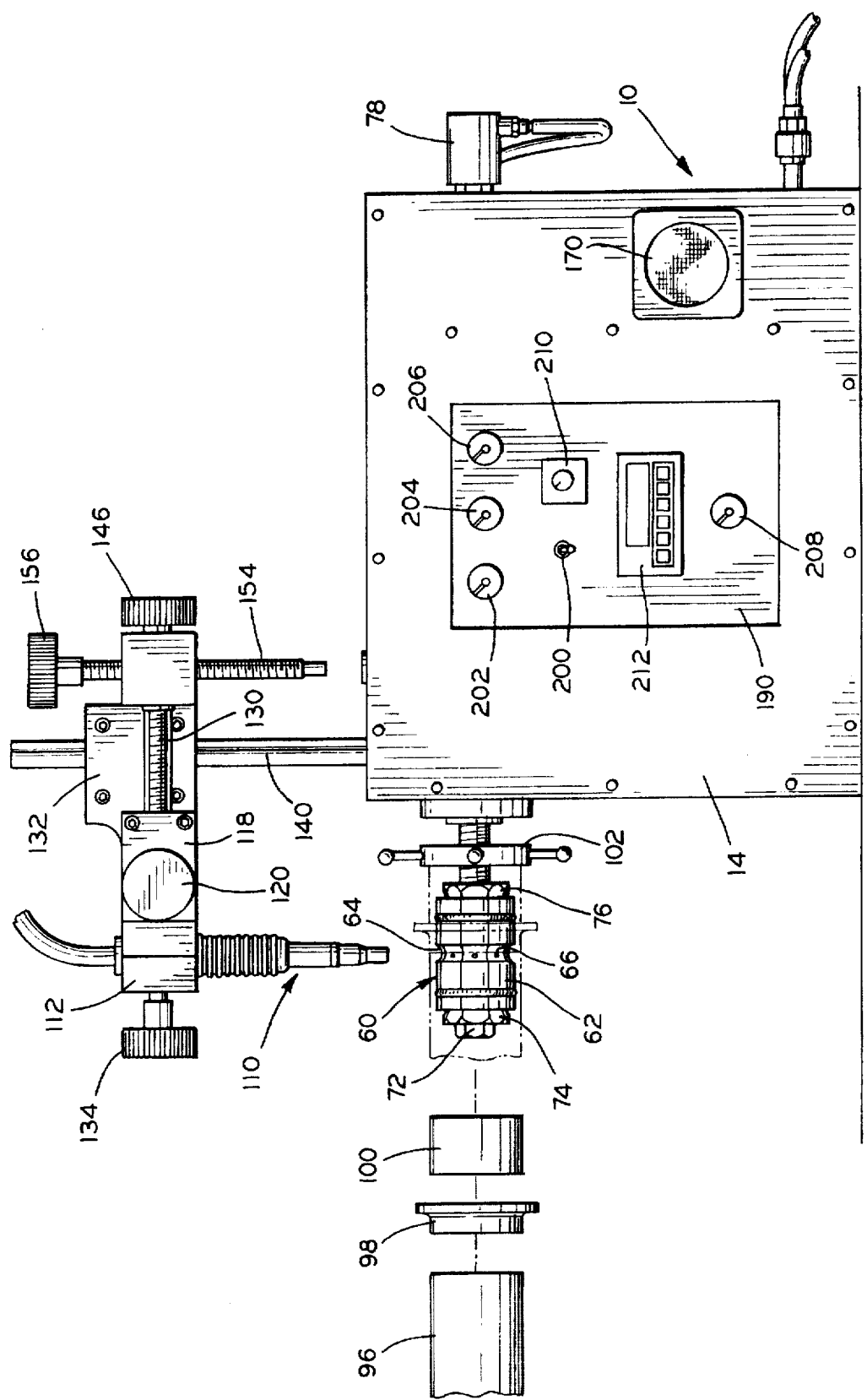
FIG. 1 is a front elevational view of an apparatus for welding tubular members incorporating the features of the invention.

Referring to the drawing, there is illustrated an apparatus for welding tubing including an outer housing 10. The housing 10 includes a base 12, a front wall 14, a rear wall 16, spaced side walls 18, 20 and 22, and a top 24. The member of the housing may be formed of any structural sound material such as stainless steel, for example, and may be joined together in a readily known manner with fasteners such as threaded fasteners as illustrated.

The spaced apart side wall 18 and 20 are provided with journal means such bearing assemblies for journally or rotatingly supporting a hollow shaft 30. More specifically, the bearing assembly in the side wall 18 is a conventional sleeve type bearing 32, while the bearing assembly in the side wall 20 includes a thrust bearing 34 and a sleeve bearing 36.

An annular grounding member 38 is keyed to the shaft 30 adjacent to and slightly spaced from the inner surface of the side wall 18. In juxtaposition to the member 38 is a pulley 40 having belt engaging teeth formed on the peripheral surface thereof. Next to and spaced from the pulley 40 is a gear member 42 of a tachometer member, not shown.

An electric motor 44 having a gear reduction output is secured to the base 12 by means of a motor mounting bracket 46. A pulley 48 having belt engaging teeth is keyed to the output shaft of the motor 44. The pulleys 40 and 48 are drivingly coupled together by a drive belt 50 preferably provided with inwardly directed teeth for suitable driving engagement with the teeth of the pulleys 40 and 48. Therefore, the motor 44 is capable of imparting rotary motion to the hollow shaft 30.

The portion of the shaft 30 which extends through the side wall 18 is provided with external threads 52 for receiving complementary internal threads of an associated expandable tool 60 for holding and aligning pipes or tubes to be welded. The tool 60 is substantially identical with the tool illustrated and defined in detail in U.S. patent application Ser. No. 08/425,903 filed Apr. 20, 1995 entitled Expandable Tool for Holding and Aligning Pipes to be Welded in the name of Jon C. Hummel. Since the apparatus and structure of the tools are the same, the description is to be incorporated by reference in the present application.

The tool 60 includes an array of gripping members 62. Each of the gripping members 62 is relatively elongate in form, and provided with an innermost surface which terminates in opposing inclined surfaces. Each of the members 62 is also provided with an outermost surface adapted to grippingly contact the inner surface of pipes to be welded together.

The outermost surface of the members 62 is formed with a central valley or groove 64 and spaced apart spring receiving grooves.

A gas passageway is formed in each of the members 62 which is adapted to extend from the inclined surface adjacent one end of the member 62 and terminate within the valley 64. The passageway is formed to exit through an outlet 66 which is positioned to cause the exiting gas to travel in a somewhat annular helical path within the valley 64. It is believed that such a path of travel will most effectively and efficiently purge the weld zone to produce the sought after acceptable welds, particularly with stainless steel and other chromium containing alloys.

The members 62 are truncated triangular in shape wherein the outermost surface is curved and forms the base of the truncated triangle. While the curvature of the outermost surface is not deemed to be critical, it is believed that ideally the surface should be formed on the same radius as the radius of the interior surface of the pipes with which the tool is to be used. Also, the degree or amount of overall contact between the outer surface and the inner surface of the associated pipes will be a function of the gas purging economy of the tool.

The tool 60 includes a centrally disposed elongate hollow shaft 68, one end of which is provided with externally formed threads 70 adapted to threadably receive an internally threaded member 72 having a wrench receiving hex shaped head portion. The member 72 is adapted to receive a conical wedge member 74. The member 74 is provided with a central bore of a slightly larger diameter than the outer diameter of the unthreaded portion of the member 72. Thus, the member 72 may move relative to the member 74. The outer surface of the wedge member 74 has a plurality of wedge shaped lands which are adapted to extend nearly the full length of the member 74. The lands 74 are angularly disposed relative to the longitudinal axis of the shaft 68 substantially the reciprocal of the angle of the inclined surface of the members 62.

The wedge member 74 is provided with a plurality of gas passageways adapted to communicate with the gas passageways of the respective members 62 and also with a gas manifold of the member 74.

The opposite portion of the shaft 68 extends through a central bore of a wedge member 76. The outer surface of the wedge member 76 has a plurality of wedge shaped lands adapted to extend nearly the full length of the member. The lands are angularly disposed relative to the longitudinal axis of the shaft 68 substantially the reciprocal of the angle of the inclined surface of the member 62. The shaft 68 extends through the hollow interior of the shaft 30 and communicates with a remote source of purge gas through a coupling 78. The purge gas communicates with the manifold through the central bore of the shaft 68 and the member 72.

A pressure fluid operated actuator motor 80 is mounted within the housing 10 between the inner side wall 20 and the side wall 22, and is typically firmly secured to the side wall 20. The motor 80 includes an outer housing 82 defining an inner chamber containing a piston 84. The piston 84 is secured to the shaft 68 in any of the known manners. The shaft 68 is adapted to extend through an end wall of the motor 80.

Pressure fluid couplings 92 and 94 are attached to the housing 82 and provide communication between a remote source of pressure fluid and the interior of the housing 82 on opposite sides of the piston 84. Through appropriate control, explained hereinafter, in respect of FIG. 6, pressure fluid may be introduced into the housing 82 through the couplings 92 and 94 to effectively impact selective reciprocal movement to the piston 84 and thence to the tool 60 through the shaft 68.

As previously mentioned, the coupling 78 is attached to the one end of the shaft 68 to provide communication between a remote source of purge gas and the annular valley or groove 64 through the shaft 68.

As illustrated in FIG. 1, it will be noted that the gripping members 62 are disposed in an annular array about the longitudinal axis of the center shaft 68. The inclined surfaces of the members 62 are urged into contact with lands of the spaced apart wedge members 76 and 74, respectively, by tension springs, disposed within appropriate grooves in a condition where the gripping members 62 are urged into the most radially inward position adjacent side walls of the gripping members are in physical contact with one another. Simultaneously, the shaft 68 and the associated wedge member 74 are caused to be moved to a position affording sufficient spacing between the wedge members 76 and 74 to enable the gripping members 62 to collapse to a relative position permitting the pipe 96 and associate ferrule 98 which are to be welded together to be placed over the exterior of the tool 60.

The annular valley or groove 64 is adapted to be in alignment with the butting ends of the pipe 96 and the ferrule 98, by the use of a spacer element 100. The spacer 100 is firmly adjusted by an adjustment wheel 102 threadably mounted on the threaded portion 52 of the shaft 30. When the desired alignment is achieved, pressure fluid is introduced into the motor 80 through the inlet coupling 92 causing the piston 84 and the associated shaft 68 to move the wedge member. Since the wedge member 76 is stationary relative to the wedge member 74, the movement of the wedge member 74 effectively causes the gripping members 62 to be cammed outwardly to effect intimate gripping contact between the outer surfaces of the members 62 and the inner surfaces of the pipe 96 and the ferrule 98. Also, it will be appreciated that with the radially outward movement of the gripping members 62, the valleys or grooves 64 are moved outwardly in unison to define an annular zone adjacent to the butting edges of the members 96 and 98 to be welded together.

The next step in the sequence of operation involves the placement of suitable welding equipment adjacent the zone to be welded.

The welding operation illustrated in the drawings is a gas tungsten arc welding often referred to as TIG (tungsten inert gas) welding. This type of welding is an arc welding process in which the heat is produced between a non-consumable electrode and the work metal. The electrode, weld pool, arc, and adjacent heated areas of the work pieces are protected by a gaseous shield. This shield is produced by a stream of gas (usually an inert gas), or a mixture of gases. The gas shield is employed to provide protection of the weldment from the presence of oxygen. Even a small amount of entrained air can contaminate the resultant weld.

The nature of gas tungsten arc welding is suitable for the welding of most metals and alloys. It has been found that the gas tungsten arc welding procedure can successfully be utilized for welding metals such as carbon and alloy steels, stainless steel, heat-resistant alloys; refractory metals, aluminum alloys, beryllium alloy, copper alloys, magnesium alloys, nickel alloys, titanium alloys, and zirconium alloys.

Gas tungsten arc welding uses the heat produced by the arc between a non-consumable tungsten or tungsten alloy electrode and the workpiece being welded. The molten weld metal, heat-affected zone (HAZ), and the non-consumable electrode are shielded from the atmosphere by an inert shielding gas which is supplied through a torch such as is generally illustrated by reference numeral 110 in FIG. 1. A weld is to be formed by applying an arc so that the butting ends of the pipe 96 and the ferrule 98 are melted and joined together as the molten metal solidifies.

In order to initiate an arc between the torch 110 and the members being welded, the torch 110 must be properly positioned. The torch 110 is suitably secured by an adjustment mechanism capable of adjusting the position of the torch 110 in the X, Y, and Z axes. More specifically, the torch 110 is held in a fixture 112. The fixture 112 includes an internally threaded follower 114 which received a lead screw 116. The lead screw 116 is journalled in a generally U-shaped member 118 and is provided with a control knob 120. The follower 114 is guided for to and fro motion by a guideway 122 integral with the member 118. Movement of the control knob 120 will effect movement of the fixture 112 and the associated torch 110 in a place perpendicular to the plane of the drawing in FIG. 1.

Figure 4:
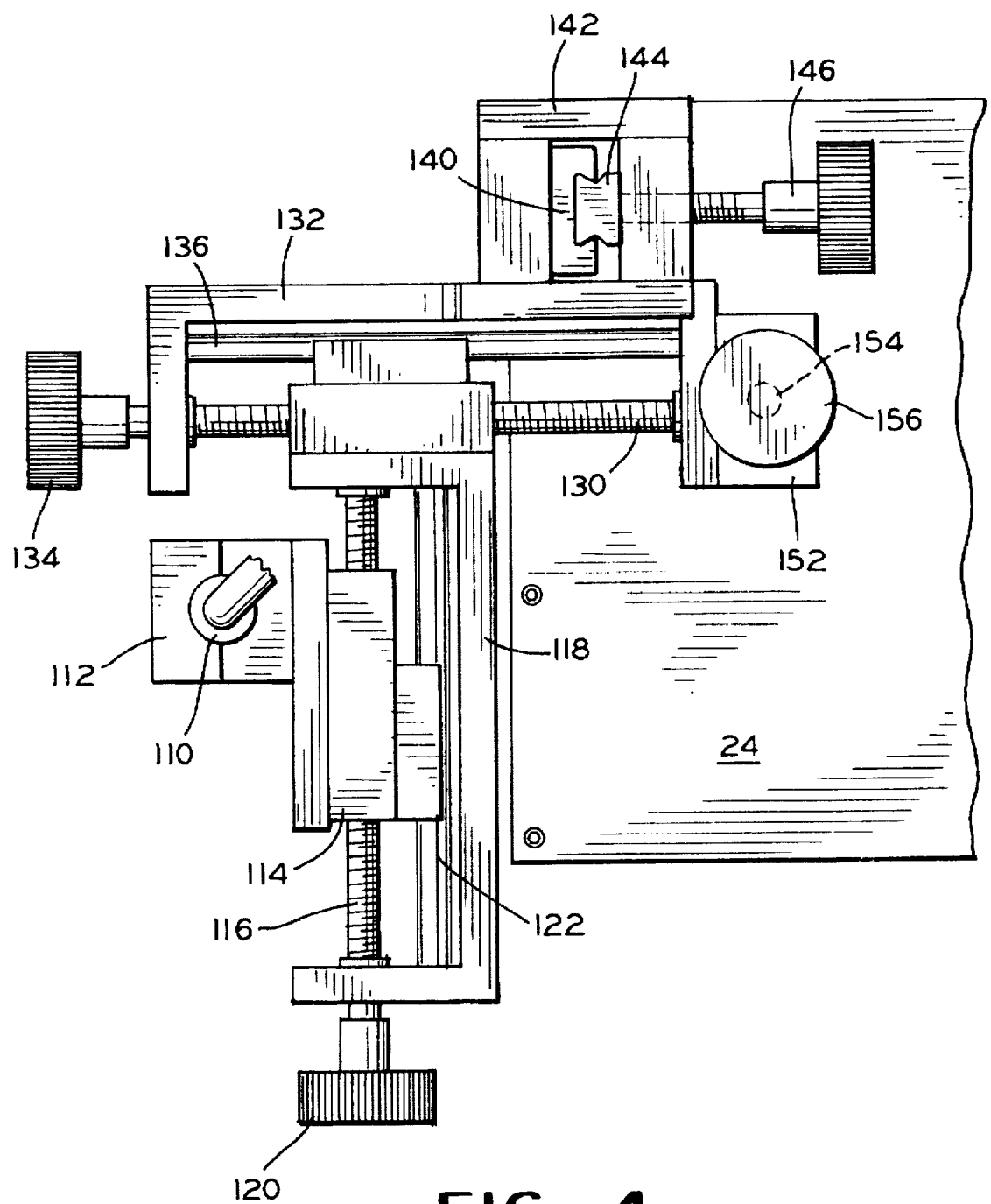
FIG. 4 is an enlarged fragmentary top plan view of the welding torch adjusting mechanism.

Next, as is clearly apparent in FIG. 4, the member 118 is provided with an internally threaded bore (not shown) which receives a lead screw 130. The lead screw 130 is journalled in a generally U-shaped member 132 and is provided with a control knob 134. The member 118 is guided for to and fro motion by a guideway 136 integral with the member 132. Movement of the control knob 134 will effect movement of the member 118 and the torch holding fixture 112 in the same plane as the control knob 120 effects movement of the member 118 and in an axis perpendicular to the first mentioned movement.

The aforementioned assembly is mounted by vertical movement on a vertically disposed reciprocally mounted shaft 140. A clamping block 142, having a locking member 144 controlled by a threaded control knob 146, is positioned on the shaft 140 and is effective to selectively position and lock the aforesaid assembly. Since the assembly includes the torch 110, it will be appreciated that movement of the shaft 140 will simultaneously effect movement of the torch 110.

A stop mechanism 150 is affixed to and integral with the member 132. The stop mechanism 150 includes an internally threaded block 152 for receiving a threaded shank 154 having a control knob 156.

Figure 3:
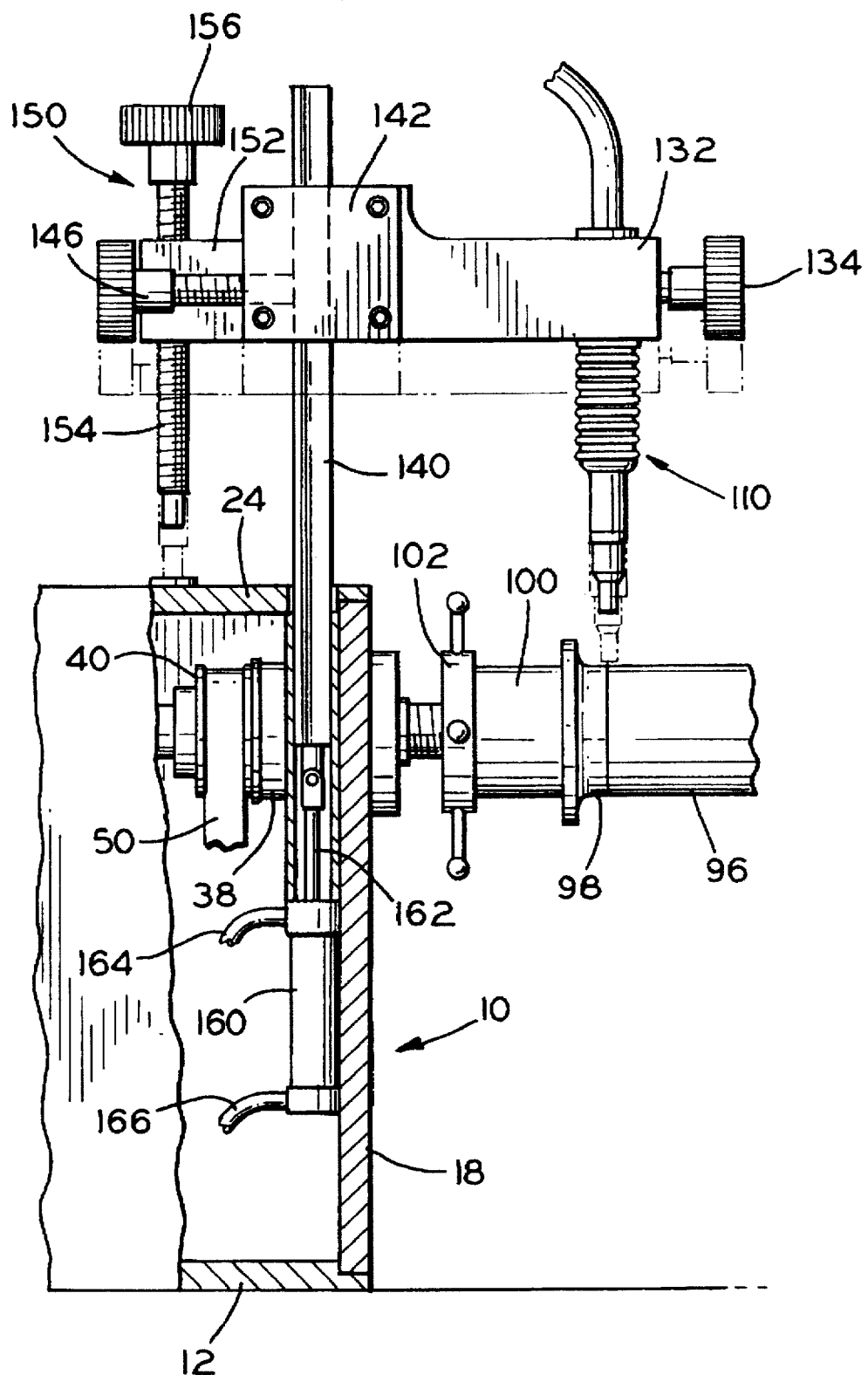
FIG. 3 is a partially in section fragmentary rear elevational view of the apparatus illustrated in FIGS. 1 and 2.

As most clearly illustrated in FIG. 3, the shaft 140 extends inwardly through a journalled opening in the top 24 of the housing 10 and terminates in a coupling with the piston rod 160 of a pressure fluid actuated motor 162. The motor 162 communicates with a source of pressure fluid through lines 164 and 166.

Figure 2:
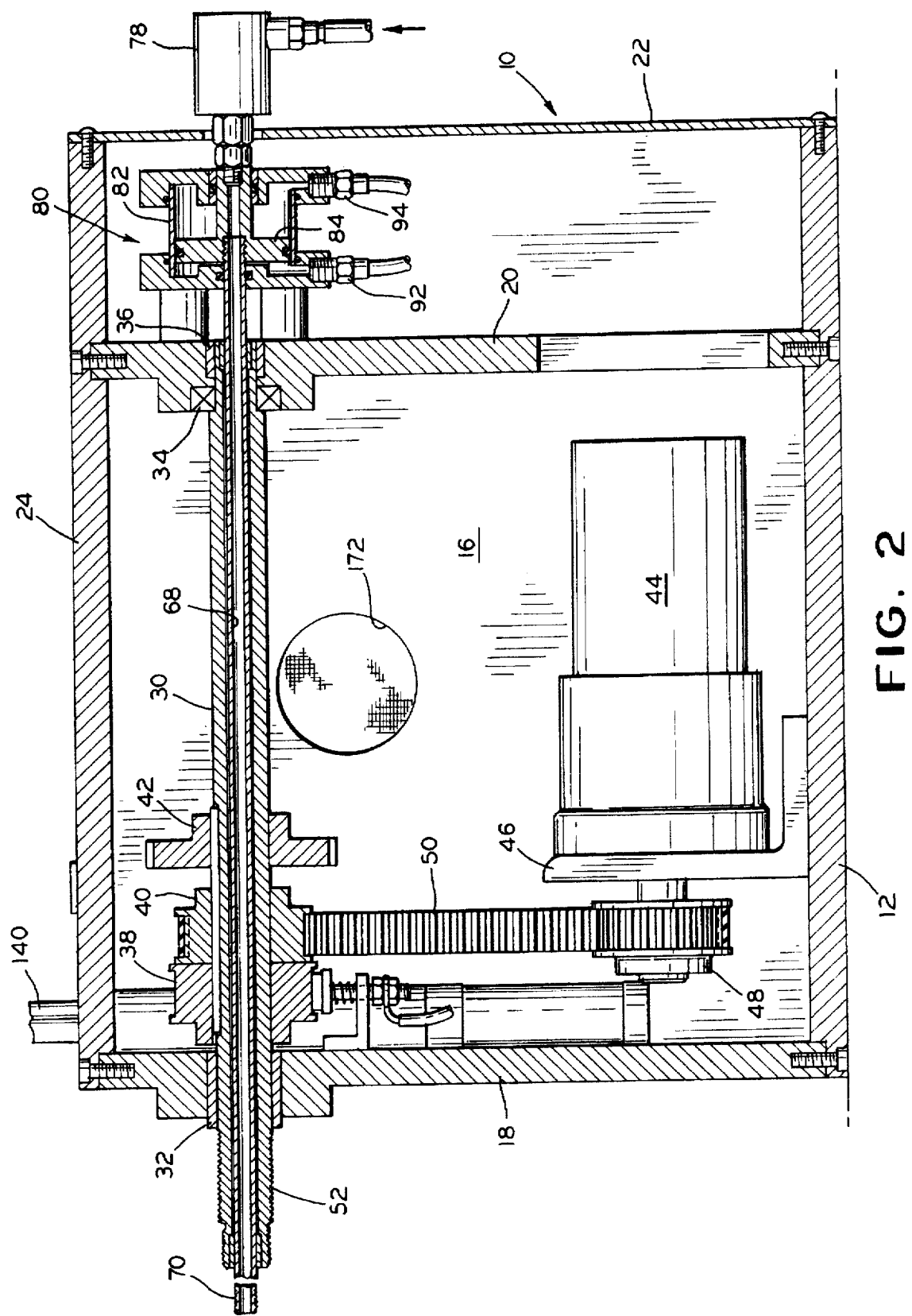
FIG. 2 is an enlarged vertical sectional view of a portion of the apparatus illustrated in FIG. 1.

Further, the front wall 14 is provided with an aperture into which is mounted a self contained electric motor driven fan 170. The fan 170 is useful in expelling heat energy from the interior of the housing 10. As shown in FIG. 2, the rear wall 16 is provided with an opening 172 to facilitate the introduction of cooling air into the interior of the housing 10 to additionally assist in militating against the build-up of heat energy within the confines of the housing 10.

The front wall 14 is also provided with a control panel 190 containing the switches and readouts necessary for the proper operation of the apparatus previously described.

Figure 5:
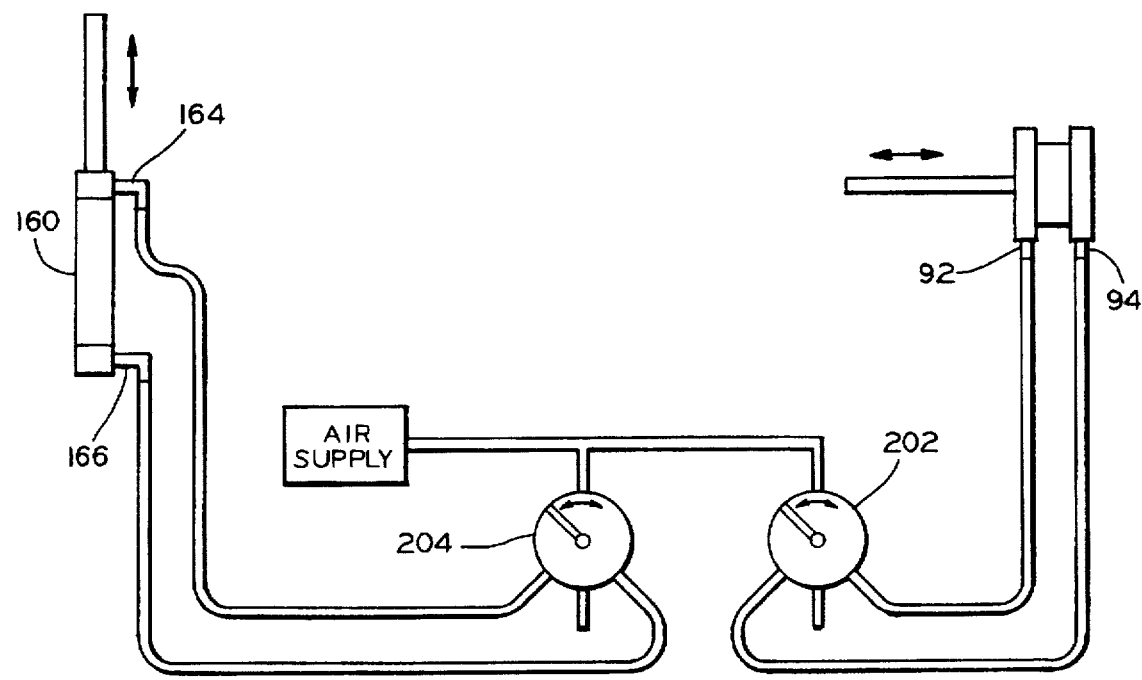
FIG. 5 is a schematic of a pneumatic system for controlling the aligning tool and vertical disposition of the welding torch.
Figure 6:
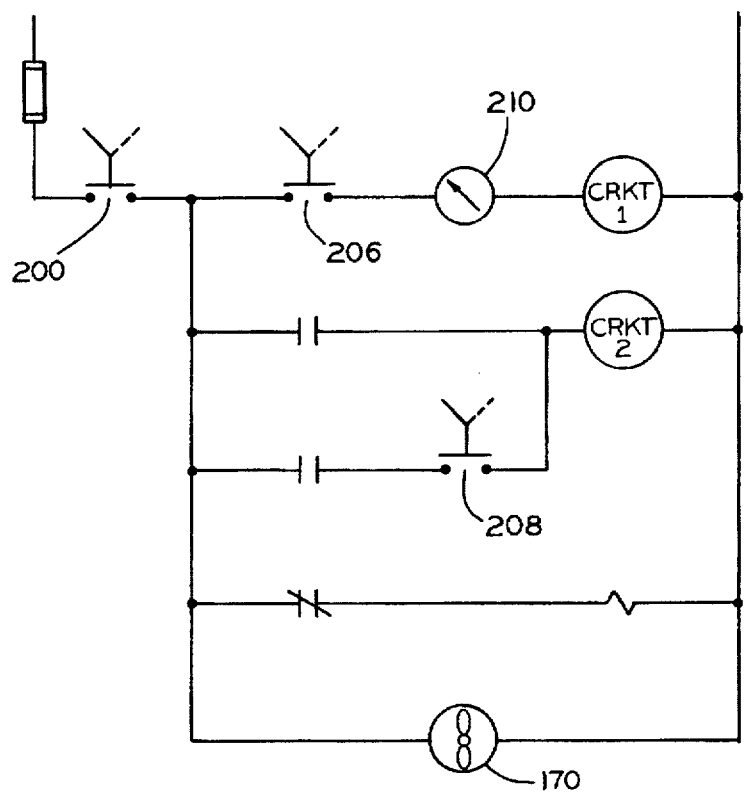
FIG. 6 is a schematic of the electrical circuit for controlling the motor and purge gas.

The operation of the apparatus is most clearly understood by reference to FIGS. 5 and 6 showing the pneumatic and electrical control circuits. Initially, a main power switch 200 mounted in the control panel 190 is switched to an "on" position. As illustrated in FIG. 6, in the "on" position of the switch 200, current is fed to energize the fan 170 and commences the circulation of air through the interior of the housing 10.

Next, the members 96 and 98 to be welded, and the spacer member 100 are positioned over the tool 60 which is in a retracted position. Following the placement of these members, the control lever of a valve 202 is moved to an "expand" position allowing the introduction of pressurized air from a remote source to be introduced to the motor 80 through line 92 to cause the piston 84 to move to the right in FIG. 2 simultaneously moving the shaft 68 to cause expansion of the gripping members 62 of the tool 60. Such expansion effects alignment of the members 96 and 98 and securely holds the members such that the butting ends are directly over the valley 64 defining an interior purge zone on the interior of the abutting members.

Following the aligning of the members 96 and 98 by the tool 60, the welding torch 110 is lowered to a welding position adjacent the butting ends of the members 96 and 98, as illustrated in dotted lines in FIG. 3, by actuation of the pressure fluid actuated motor 160. Such operation is achieved by moving the control lever of a valve 204 to a "down" position allowing the introduction of pressure fluid from the remote source into the motor 160 through the line 164 and allowing the motor 160 to exhaust through the line 166.

Typically, a switch 208 is moved to an "auto" purge position. In such position, as will be manifest from the schematic of FIG. 6, when the switch 206 is moved to an "on" position, current is delivered to the motor 44 causing rotation thereof and simultaneously opening a valve in the coupling 78 to allow a purge gas to flow to the tool 60 and exit through the outlets 66. The purge gas then effectivly flows through the valleys or groove 64 in a generally annular path and exis the system through the gaps between the adjacent expanded gripping members 62. Rotation of the motor 44 causes the output shaft of the associated gear reduction section to drive the pulley 48, the belt 50, and the pulley 40. The pulley 40 will cause the shaft 30 and the associated tool 60 to rotate. In turn, the aligned members 96 and 98 are rotated under the welding torch 110.

The welding is achieved by utilizing the heat produced by an arc between the non-consumable electrode of the welding torch 110 and the members 96 and 98 being welded. The electric arc is produced by the passage of current through the ionized inert shielding or purge gas being fed to the torch 110. It will be appreciated that the electrical circuit is made through work pieces 96 and 98 which are grounded or otherwise in an electrical circuit through the grounding member 38 which is typically through an electrical connection as illustrated in FIG. 2. The electrical arc established by the passage of electrical current through ionized gas, causes positive gas ions to flow from the position to the negative pole of the arc, while the electrons travel from the negative to the positive pole. The power expended in the arc is the product of the current passing through the arc and the voltage drop across the arc. Satisfactory results have been found by using a HOBART TIGWAVE 250 manufactured by Hobart Brothers Company, Troy, Ohio, and a WP-9 Welding Torch manufactured by Weldcraft Products, Inc., Burbank, Calif. The associated power supply includes a high frequency spark starting apparatus which produces a high frequency spark to initiate and stabilize the arc. High voltage direct current arc initiation is also used in some welding machines.

Once the arc is properly established, the shaft 30 is rotated through 360°. During the rotation, it will be appreciated that the arc causes the formation of a puddle of molten metal which through the effect of gravity tends to sag, forming a concave upper surface and a convex lower surface. In many applications such weld shape is unacceptable. With the present apparatus, this phenomenon can be readily overcome by establishing an internal pressure by the purge gas being introduced through the outlets 66 sufficient to support the molten metal of the puddle to create a substantially flat lower and upper surface such that upon solidification of the molten metal the weld zone is substantially planar with the adjacent portions or surfaces of the members 96 and 98 being welded.

There is also provided an adjustable potentiometer 210 for adjusting the current fed to the motor 44 and thereby effect the rotational speed. The speed of the motor 44 determines the rotational speed of the shaft 30 which is sensed by tachometer 42 and the display on the visual display 212 on the central panel 190. Also, it will be understood that as the purge gas travels through the grooves or valleys 64, the purge gas displaces the air (containing oxygen) in the weld zone and effectvely removes heat energy therefrom.

Once the weld has been completed, the switch 206 is typically opened to stop any further electrical current flow stopping the rotation of the shaft 30 and preventing any further flow of the purge gas. Following the actuation of the switch 206 to an "off" position, the valve 204 is moved to an "up" position causing the shaft 140 to raise the welding torch 110, and the valve 202 is then moved to a "retract" position, enabling the welded members 96 and 98 to be removed as a unitary assembly.

It will also be understood that while mention has been made in the foregoing description of the use of gas tungsten arc welding, other welding techniques may also be satisfactorily employed such as, for example, plasma arc welding. Plasma arc welding is an arc welding process that joins metals by heating them with a constricted arc between an electrode and the work piece. Shielding is generally obtained from the hot, ionized gas issuing from the torch. The plasma gas is generally supplemented by an auxiliary source of shielding gas. Like gas tungsten arc welding, plasma arc welding uses a non-consumable electrode.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A process for welding two tubular members in butting relation, including the steps of
   a) disposing the ends of the tubular members in butting relation;
   b) forming an annular weld zone adjacent the inner surfaces of the tubular members in the region of the butting ends of the tubular members by an inner mandrel having outwardly extending gripping members defining the annular weld zone;
   c) delivering a purge gas to the zone and causing the purge gas to flow in the zone along an annular helical path adjacent the inner surfaces of the tubular members;
   d) positioning a welding torch adjacent the outer surface of the tubular members at the butting ends thereof; and
   e) effecting relative movement between the torch and the tubular members to weld the butting ends of the tubular members together in a purge gas atmosphere.

2. The process defined in claim 1 wherein the tubular members are formed of stainless steel.

3. The process defined in claim 1 wherein the gripping means is formed of a heat energy conducting material to convey heat energy away from the butting ends of tubular members.

4. The process defined in claim 1 wherein the purge gas contains a major portion of argon gas.

5. A process for welding two hollow tubular members in butting relation, including the steps of:
   a) disposing the ends of the tubular members in butting relation;
   b) maintaining axial alignment of the tubes by an inner mandrel containing a plurality of outwardly extending gripping members wherein the gripping members define an enclosed annular weld zone adjacent the inner surfaces of the hollow tubular members in the region of the butting ends thereof;
   c) delivering a purge gas to the weld zone and causing the purge gas to flow in the annular weld zone adjacent the inner surfaces of the tubular members;
   d) allowing the purge gas to flow through and exit the annular weld zone through spaces between the adjacent ones of the outwardly extending gripping members;
   e) positioning a welding torch adjacent the outer surface of the tubular members at the butting ends thereof; and
   f) effecting relative movement between the torch and the tubular members to weld the butting ends of the tubular members together in a purge gas atmosphere.

* * * * *